(12) United States Patent
Xiao et al.

(10) Patent No.: US 8,634,199 B2
(45) Date of Patent: Jan. 21, 2014

(54) COMPUTER MINI-CARD CONNECTION ASSEMBLY

(75) Inventors: Yong-Hua Xiao, Shenzhen (CN); Tsung-Hsien Lin, New Taipei (TW); Xin Ji, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/329,237

(22) Filed: Dec. 17, 2011

(65) Prior Publication Data

US 2012/0327576 A1 Dec. 27, 2012

(30) Foreign Application Priority Data

Jun. 23, 2011 (CN) .......................... 2011 1 0170609

(51) Int. Cl.
*H05K 1/00* (2006.01)
*H05K 1/18* (2006.01)
*H05K 7/00* (2006.01)

(52) U.S. Cl.
USPC .......................................... 361/748; 361/736

(58) Field of Classification Search
USPC ............. 361/679.01, 679.32, 679.58, 679.02, 361/748, 752, 753, 760, 761
See application file for complete search history.

(56) References Cited

U.S. PATENT DOCUMENTS

| | | | | |
|---|---|---|---|---|
| 5,853,297 | A * | 12/1998 | Moulton et al. | 439/327 |
| 6,570,775 | B2 * | 5/2003 | Lai | 361/801 |
| 6,731,515 | B2 * | 5/2004 | Rhoads | 361/796 |
| 2008/0101051 | A1 * | 5/2008 | Middleton et al. | 361/796 |
| 2009/0231798 | A1 * | 9/2009 | Skinner | 361/679.31 |
| 2011/0294309 | A1 * | 12/2011 | Chen et al. | 439/65 |

* cited by examiner

*Primary Examiner* — Bernard Rojas
(74) *Attorney, Agent, or Firm* — Altis Law Group, Inc.

(57) ABSTRACT

A connection device is used to mount a computer mini-card. The connection device includes a board, an edge connector formed a bottom side of the board, a socket, and a pole. The socket is mounted on a first side surface of the board to connect to the computer mini-card, and is electrically connected to the edge connector. The pole extends from the first side surface of the board to fix an end of the computer mini-card opposite to the socket.

4 Claims, 2 Drawing Sheets

COMPUTER MINI-CARD CONNECTION ASSEMBLY

BACKGROUND

1. Technical Field

The present disclosure relates to computer connection assembly, and particularly, to a computer mini-card connection assembly.

2. Description of Related Art

In computers, when mini-cards such as peripheral component interconnection (PCI) express small form factor expansion cards are used, the cards need to be inserted into specific sockets of motherboards of the computers. The sockets are directly mounted on the motherboards. However, the sockets take up a lot of space of the motherboards.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present disclosure. Moreover, in the drawings, all the views are schematic, and like reference numerals designate corresponding parts throughout the several views.

The FIG. 1 is an exploded, isometric view of an exemplary embodiment of a peripheral component interconnection (PCI) express small form factor expansion card connection assembly.

DETAILED DESCRIPTION

The disclosure, including the accompanying drawing in which like references indicate similar elements, is illustrated by way of example and not by way of limitation. It should be noted that references to "an" or "one" embodiment in this disclosure are not necessarily to the same embodiment, and such references mean at least one.

Figure 1:
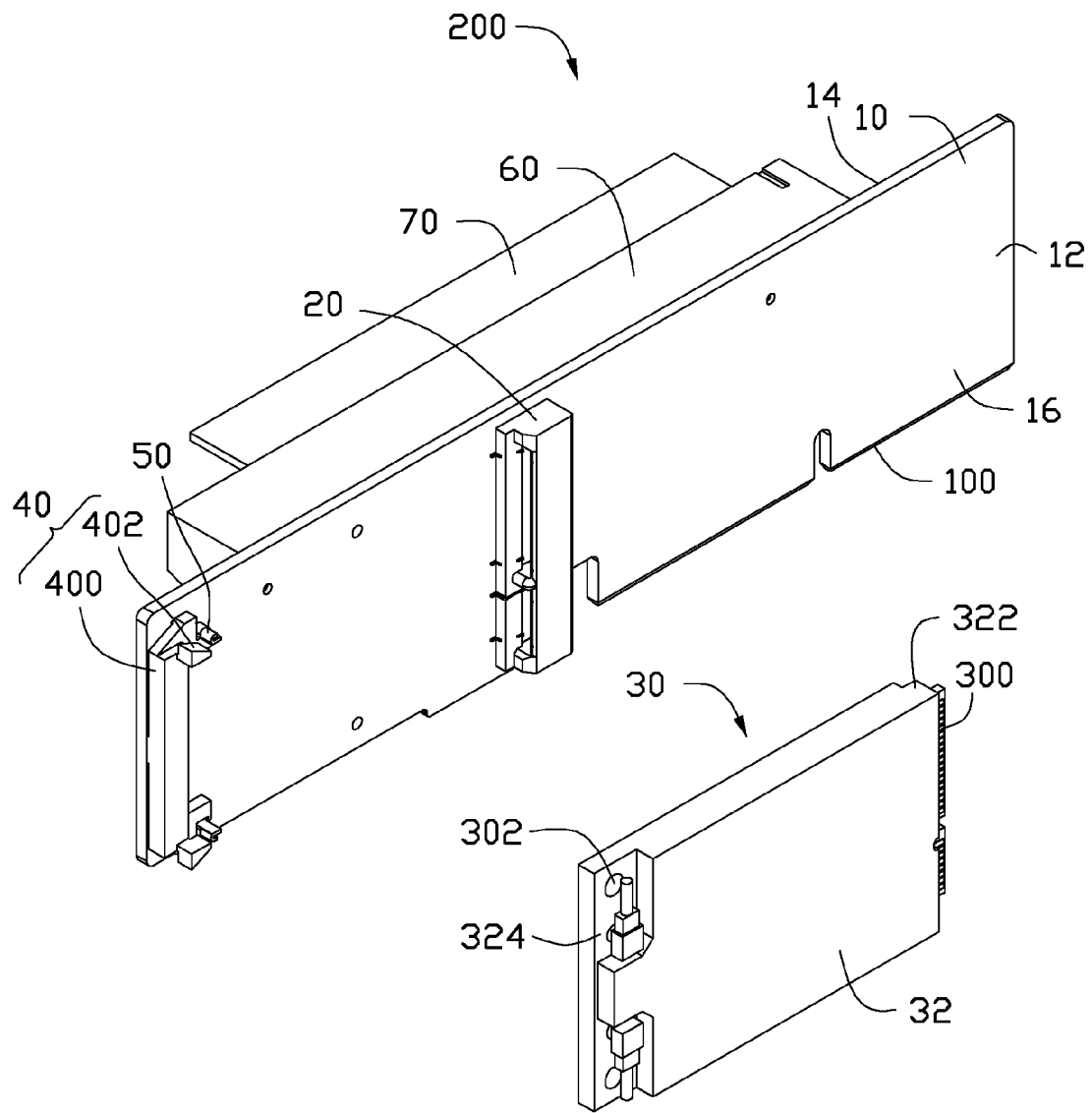
Figure 2:
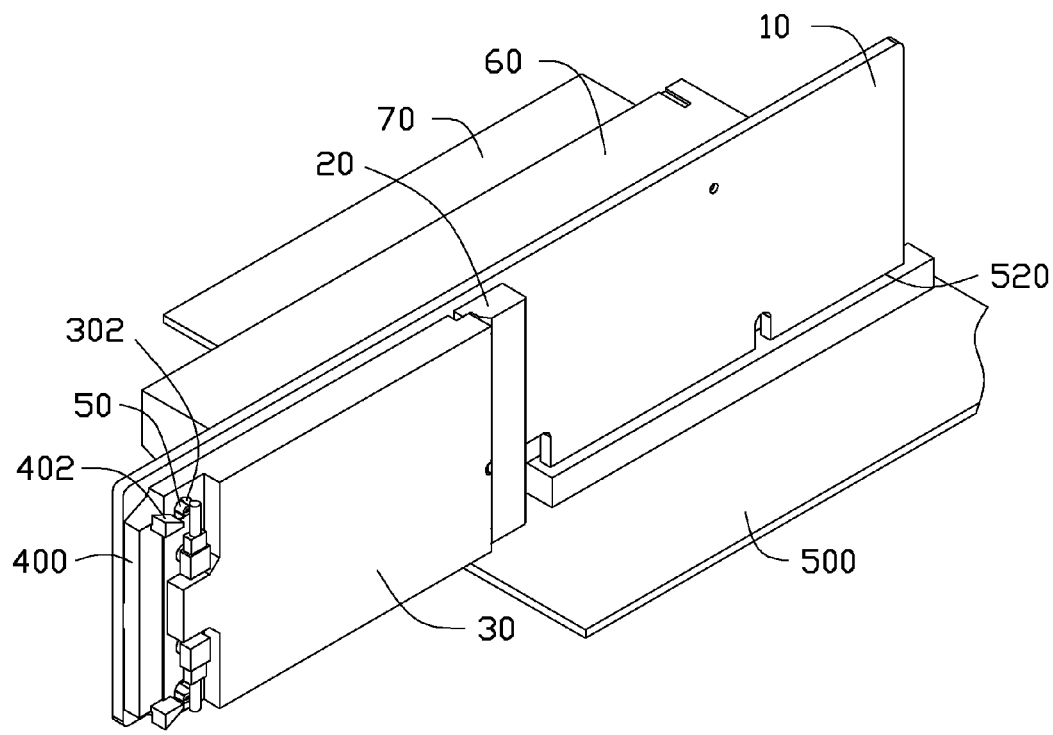
FIG. 2 is an assembled, isometric view of FIG. 1, connected to an motherboard.

Referring to the FIGS. 1 and 2, an embodiment of a computer mini-card connection assembly includes a connection device 200 and a computer mini-card 30 such as a peripheral component interconnection (PCI) express small form factor expansion card, a flash memory (not shown), and so on. The connection device 200 includes a board 10, a first socket 20 mounted on a first side surface 12 of the board 10, a second socket 60 mounted on a second side surface 14 of the board 10 opposite to the first side surface 12, two poles 50 extending from an end of the first side surface 12, and an edge connector 100 formed on a bottom side 16 of the board 10. The edge connector 100 is electrically connected to the first and second sockets 20 and 60. The first socket 20 is used to connect to the computer mini-card 30. The second socket 60 is used to connect to an external device 70. The edge connector 100 is used to insert into a PCI slot 520 of a motherboard 500, to allow the computer mini-card 30 and the external device 70 to communicate with the motherboard 500.

The computer mini-card 30 includes a main body 32, an inserting portion 300 extending from a first end 322 of the main body 32 to be inserted into the first socket 20, and two holes 302 defined in a second end 324 of the main body 32 opposite to the first end 322.

The connection device 200 further includes a stopping element 40 extending from the first side surface 12 of the board 10 and near the poles 50. The stopping element 40 includes a stopping portion 400 connected to the first side surface 12 and two blocks 402 rotatably mounted on opposite ends of the stopping portion 400, respectively adjacent to the poles 50. The stopping portion 400 is used to stop the computer mini-card 30. When the blocks 402 are rotated, the blocks 402 can extend out of the stopping portion 400.

Referring to FIG. 2, in assembly, the inserting portion 300 of the computer min-card 30 is inserted into the first socket 20 of the connection device 200 and parallel to the board 10. The poles 50 of the connection device 200 are engaged with the corresponding holes 302 of the computer mini-card 30. The stopping portion 400 stops the second end 324 of the main body 32 to sandwich the computer mini-card 30 with the first socket 20. The blocks 402 are rotated to extend out of the stopping portion 400 to abut against the second end 324 of the main body 32 toward the board 10. Therefore, the computer mini-card 30 is fixed on the connection device 200. When the edge connector 100 is inserted into the PCI slot 520 of the motherboard 500, the computer mini-card 30 can communicate with the motherboard 500.

The computer mini-card 30 is assembled in the motherboard 500 by insertion of the connection device 200 into the PCI slot 520 of the motherboard 500, rather than being directly assembled in the motherboard 500. Therefore, space on the motherboard is saved.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A connection device to fix a computer mini-card, the connection device comprising:
   a board;
   an edge connector formed a bottom side of the board to connect to an expansion slot of a motherboard;
   a first socket mounted on a first side surface of the board to connect to the computer mini-card, and electrically connected to the edge connector to allow the computer mini-card to communicate with the motherboard;
   a pole extending from the first side surface of the board to fix an end of the computer mini-card opposite to the first socket; and
   a second socket, wherein the second socket is mounted on a second side surface of the board opposite to the first side surface to connect to an external device, the second socket is electrically connected to the edge connector.

2. The connection device of claim 1, further comprising a stopping element mounted on the first side surface of the board, wherein the stopping element comprises a stopping portion to sandwich the computer mini-card with the first socket, and a block rotatably mounted to the stopping portion to abut against the end of the computer mini-card toward the board.

3. A computer mini-card connection assembly comprising:
   a computer mini-card comprising:
   a main body defining a hole in a second end; and
   an inserting portion extending from a first end of the main body opposite to the second end;
   a connection device comprising:
   a board;
   an edge connector formed a bottom side of the board to connect to an expansion slot of a motherboard;

a first socket mounted on a first side surface of the board to engage the inserting portion of the computer mini-card, and electrically connected to the edge connector to allow the computer mini-card to communicate with the motherboard; and a pole extending from the first side surface of the board to be engaged in the hole of the computer mini-card to fix the computer mini-card on the connection device; and a second socket, wherein the second socket is mounted on a second side surface of the board opposite to the first side surface to connect to an external device, the second socket is electrically connected to the edge connector.

4. The computer mini-card connection assembly of claim 3, further comprising a stopping element mounted on the first side surface of the board, wherein the stopping element comprises a stopping portion to stop the first end of the computer mini-card and a block rotatably mounted to the stopping portion to abut against the first end of the computer mini-card toward the board.

* * * * *